United States Patent
Demon et al.

(10) Patent No.: US 10,051,792 B2
(45) Date of Patent: Aug. 21, 2018

(54) AGRICULTURAL BALER WITH A PLUNGER SLOT BELT

(71) Applicant: CNH Industrial America LLC, New Holland, PA (US)

(72) Inventors: Frederik Demon, Brugge (BE); Patrick Staelens, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 445 days.

(21) Appl. No.: 14/610,242

(22) Filed: Jan. 30, 2015

(65) Prior Publication Data
US 2015/0208585 A1 Jul. 30, 2015

(51) Int. Cl.
*A01F 15/08* (2006.01)
*A01F 15/04* (2006.01)
*A01F 15/18* (2006.01)
*B30B 9/30* (2006.01)

(52) U.S. Cl.
CPC ............ *A01F 15/08* (2013.01); *A01F 15/042* (2013.01); *A01F 15/046* (2013.01); *A01F 15/18* (2013.01); *B30B 9/3021* (2013.01)

(58) Field of Classification Search
CPC .. A01F 15/08; A01F 2015/077; A01F 15/042; A01F 15/046; A01F 15/18; A01F 15/0841; A01F 15/02; A01F 15/101; A01F 15/044; A01F 2015/103; B30B 9/3021
See application file for complete search history.

(56) References Cited

U.S. PATENT DOCUMENTS

| | | | | |
|---|---|---|---|---|
| 779,736 A | * | 1/1905 | Richmond | A01F 15/101 100/142 |
| 1,114,681 A | * | 10/1914 | Duncan | A01F 15/101 100/189 |
| 2,017,971 A | * | 10/1935 | Howard | A01F 15/101 198/732 |
| 2,294,440 A | * | 9/1942 | Barker | A01F 15/101 100/100 |
| 2,658,323 A | * | 11/1953 | Russell | A01F 15/101 100/100 |
| 3,059,569 A | | 10/1962 | Nolt | |
| 4,135,445 A | | 1/1979 | Smith | |
| 4,375,786 A | * | 3/1983 | Oosterling | A01F 15/046 100/142 |

(Continued)

FOREIGN PATENT DOCUMENTS

DE 4032393 A1 5/1991
DE 288309 B5 6/1995
(Continued)

*Primary Examiner* — Moshe Wilensky
*Assistant Examiner* — Joseph Finan, Jr.
(74) *Attorney, Agent, or Firm* — Patrick M. Sheldrake

(57) ABSTRACT

An agricultural baler comprising a main bale chamber having a pair of opposed side walls, with each side wall having a plunger slot arrangement defining a plunger slot. Each plunger slot has opposite ends and is open at an inside adjacent to a plunger. A pair of rotating elements are positioned within each plunger slot, with each rotating element being located at a corresponding end of a respective plunger slot. A pair of plunger slot belts are each positioned in association with a respective plunger slot and partially wrap a respective pair of rotating elements associated with each plunger slot.

9 Claims, 5 Drawing Sheets

(56) References Cited

U.S. PATENT DOCUMENTS

| | | | |
|---|---|---|---|
| 2012/0240793 A1* | 9/2012 | Dedeurwaerder | .... A01F 15/042 100/3 |
| 2013/0047867 A1 | 2/2013 | Van De Laarschot et al. | |
| 2015/0189836 A1* | 7/2015 | Verhaeghe | .............. A01F 15/10 56/341 |

FOREIGN PATENT DOCUMENTS

| EP | 0311764 A1 | 4/1989 |
|---|---|---|
| EP | 0315521 A1 | 5/1989 |
| FR | 2143033 A1 | 2/1973 |
| GB | 773068 A | 4/1957 |
| GB | 2145968 A | 4/1985 |

\* cited by examiner

AGRICULTURAL BALER WITH A PLUNGER SLOT BELT

BACKGROUND OF THE INVENTION

This application claims foreign priority under 35 U.S.C. §119 to Belgian Application BE2014/0053 filed Jan. 30, 2014 titled "Agricultural Baler with a Plunger Slot Belt" and having Frederik Demon and Patrick Starlens as inventors. The full disclosure of BE2014/0053 is hereby incorporated herein by reference.

1. Field of the Invention

The present invention relates to agricultural balers, and, more particularly, to bale chambers within such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

During the bale formation within the bale chamber, as described above, crop material can be forced through the plunger slots on opposite sides of the bale chamber. The crop material can accumulate outside of the bale chamber, such as in an area around the axle, or in an area between the twine box and the frame. It is thus necessary for the operator to periodically dismount from the traction unit and clean the crop from the baler. This takes time and effort on the part of the operator, reducing the baling efficiency of the baler. Further, some of the crop that extends into the plunger slot forms a visible artifact on the sides of the formed bales, known as a "plunger slot printout".

What is needed in the art is an agricultural baler which avoids problems of crop accumulation in areas outside of the bale chamber, and reduces the plunger slot printout on formed bales.

SUMMARY OF THE INVENTION

The present invention provides an agricultural baler with a plunger slot belt which substantially covers an inside of a corresponding plunger slot, thereby inhibiting crop material from exiting through the plunger slot.

The invention in one form is directed to an agricultural baler including a main bale chamber having a pair of opposed side walls, with each side wall having a plunger slot arrangement defining a plunger slot. Each plunger slot has opposite ends and is open at an inside adjacent to a plunger. A pair of rotating elements are positioned within each plunger slot, with each rotating element being located at a corresponding end of a respective plunger slot. A pair of plunger slot belts are each positioned in association with a respective plunger slot and partially wrap a respective pair of rotating elements associated with each plunger slot.

An advantage of the present invention is that crop material is inhibited from passing through the plunger slot and accumulating on the baler in an area outside of the main bale chamber.

Another advantage is that the belt substantially entirely closes off the inside of the plunger slot, adjacent to the inside of the main bale chamber.

Yet another advantage is that the belt also substantially entirely closes off the outside of the plunger slot.

A further advantage is that the belt can be attached to the plunger, causing the belt to reverse directions of rotation as the plunger reciprocates back and forth within the main bale chamber.

A still further advantage is that a so-called "plunger slot printout" on formed bales is reduced.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
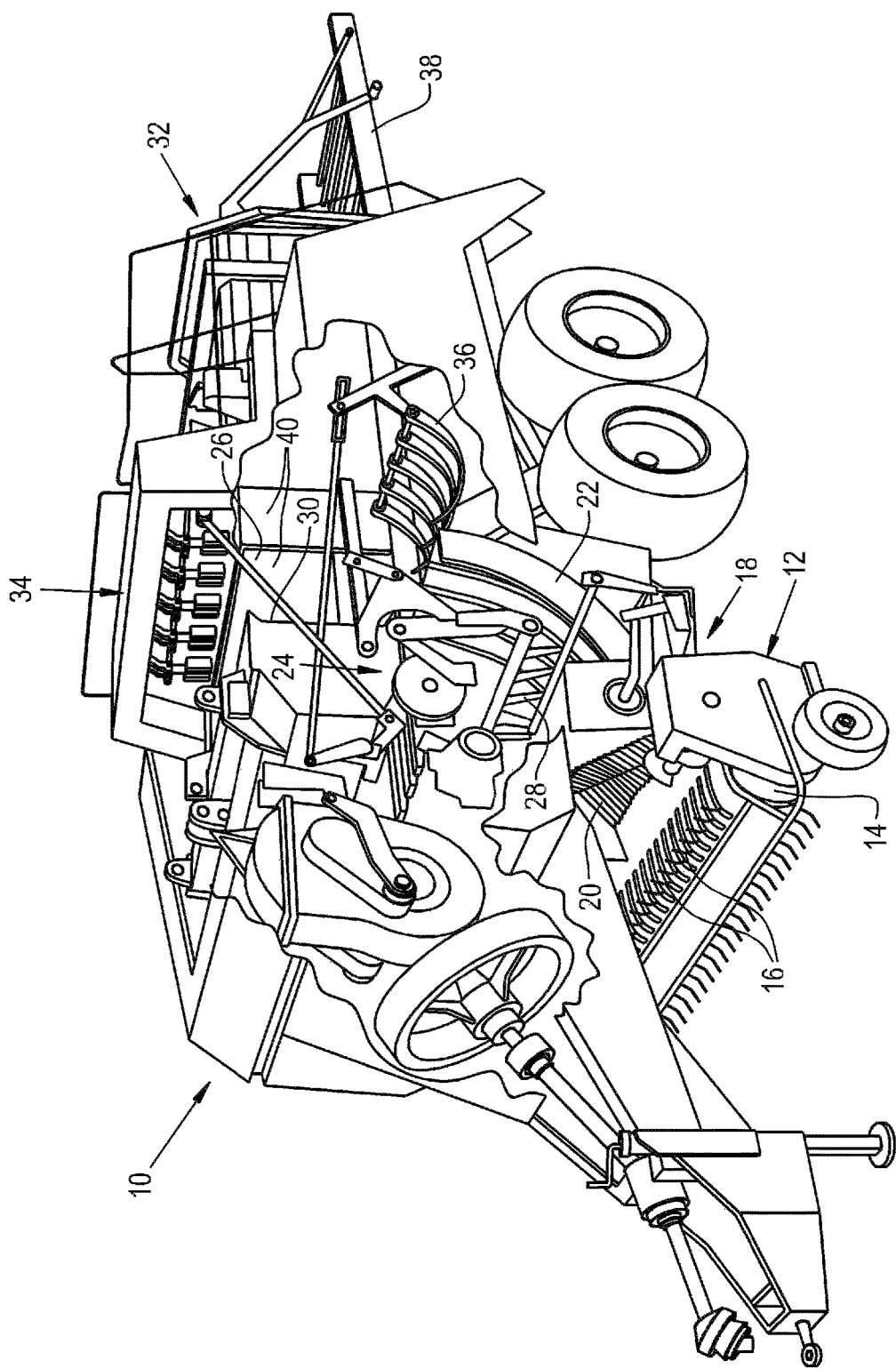
FIG. 1 is a perspective cutaway view showing the internal workings of a large square baler, which may include a main bale chamber having a plunger slot arrangement with a plunger slot belt of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Referring now to FIGS. 1-4, conjunctively, the main bale chamber 26 includes a pair of side walls 40, with each side wall 40 having a plunger slot arrangement defining a plunger slot 42 therein. Each plunger slot 42 has a longitudinal extension in the directions of reciprocating movement of the plunger 30, and supports the plunger 30 during the plunger strokes within the main bale chamber 26. Each plunger slot 42 is sized and configured to receive one or more rollers 44 (FIGS. 3 and 4) which extend laterally from each side 46 of the plunger 30. The plunger 30 is shown with first and second rollers, designated 44A and 44B, which travel within a corresponding plunger slot 42; however, the number of rollers 44 extending from each side 46 can vary.

Figure 2:
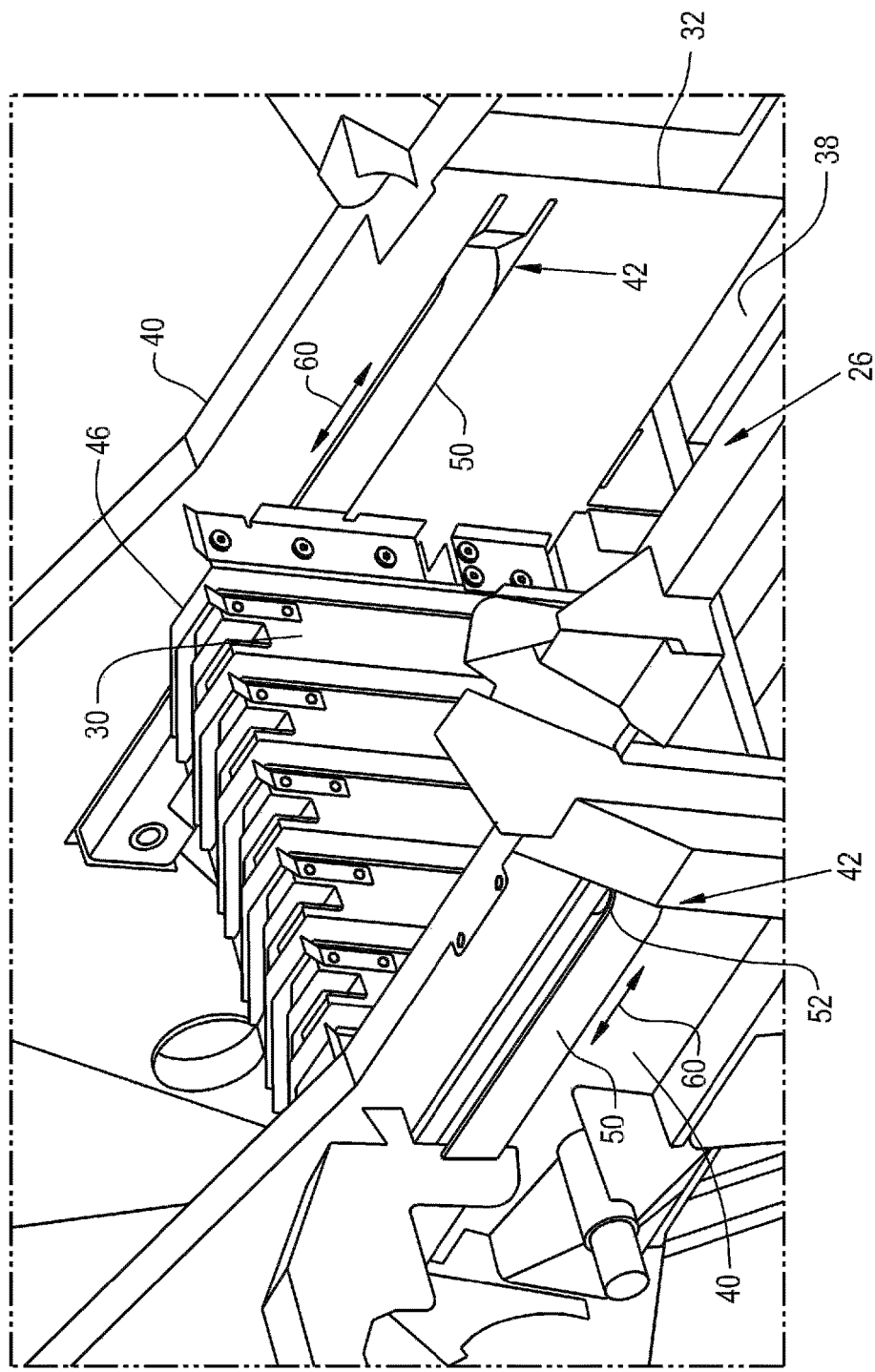
FIG. 2 is a top perspective view of the main bale chamber shown in FIG. 1 with the top wall of the main bale chamber removed, showing the side walls defining a plunger slot arrangement and an embodiment of a plunger slot belt of the present invention.
Figure 3:
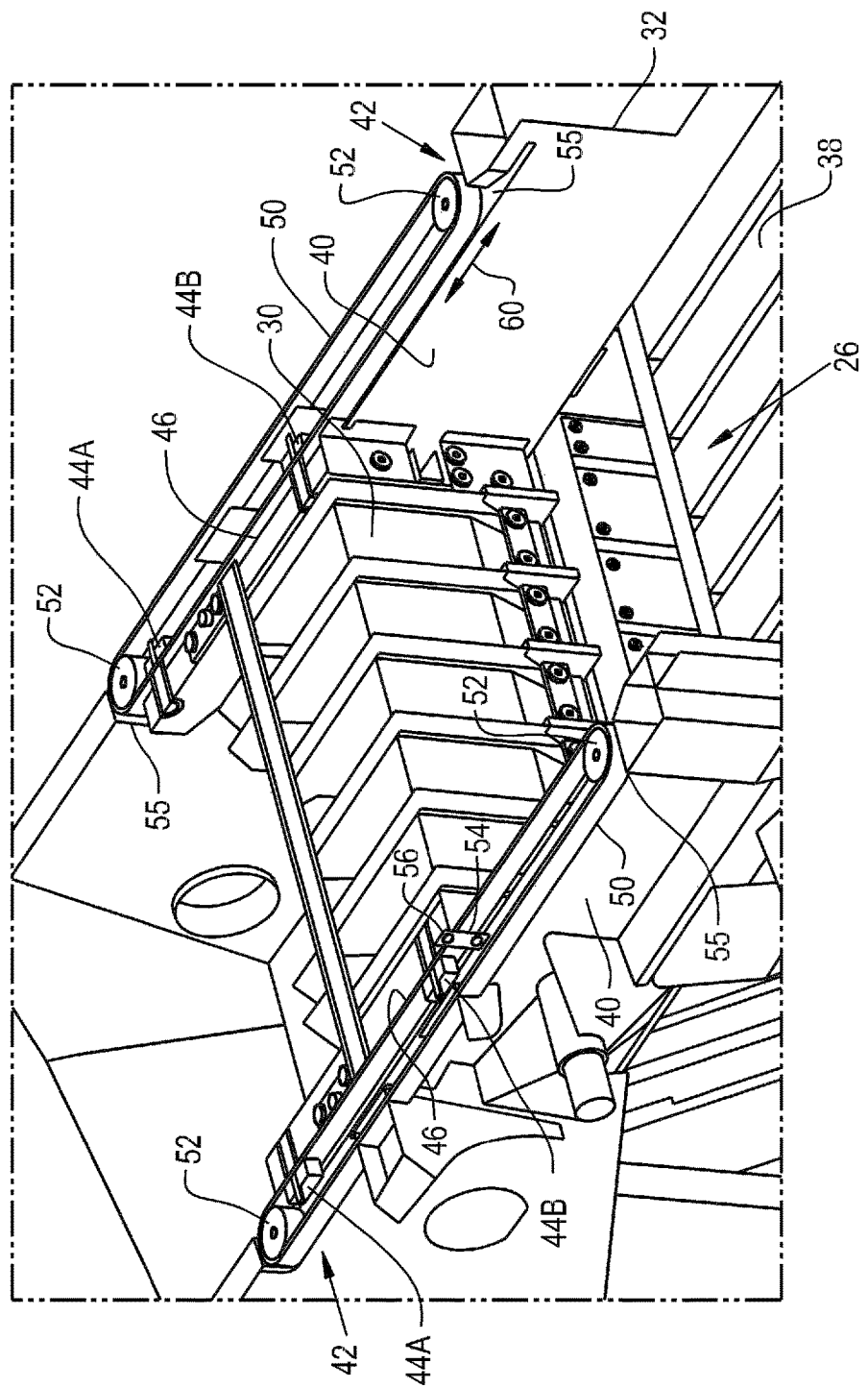
FIG. 3 is a top perspective view of the main bale chamber shown in FIGS. 1 and 2, with the side walls removed above the plunger slots, and the plunger in a rearward-most position.
Figure 4:
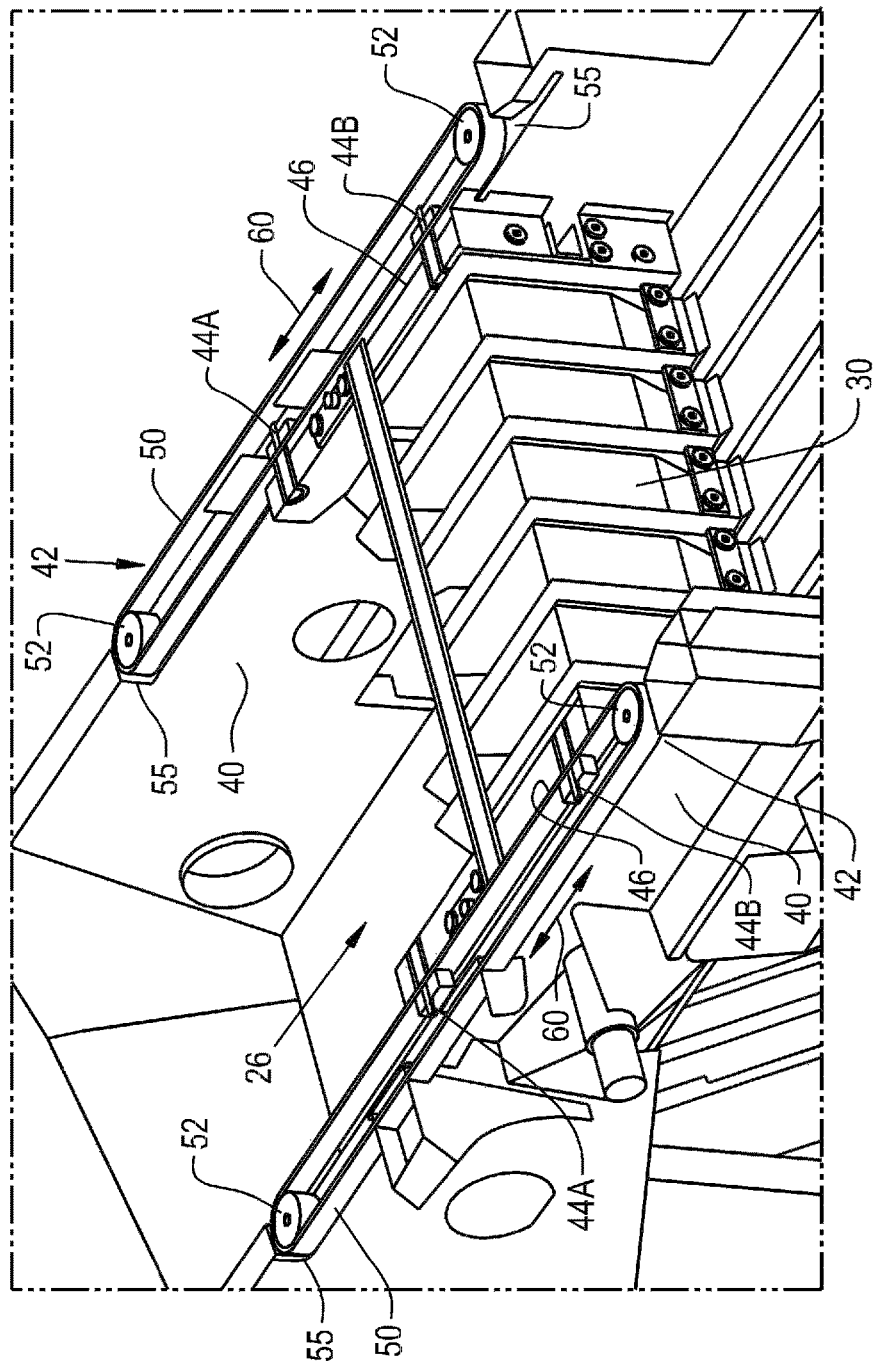
FIG. 4 is a top perspective view of the main bale chamber shown in FIGS. 1-3, with the side walls removed above the plunger slots, and the plunger in a forward-most position.

According to an aspect of the present invention, and referring now to FIGS. 2-4, a pair of plunger slot belts 50 substantially cover respective plunger slots 42 in a manner which inhibits crop from exiting the plunger slot 42, inhibits buildup of crop within the plunger slot 42, and reduces the plunger slot printout on the sides of the formed bales. More particularly, each plunger slot belt 50 is positioned in association with a respective plunger slot 42 and partially wraps a respective pair of rotating elements 52 associated with each plunger slot 42. Each pair of rotating elements 52 is positioned within each plunger slot 42, with each individual rotating element 52 being located at a corresponding end 55 of the plunger slot 42. Each rotating element 52 has a diameter that generally corresponds to the width of the plunger slot 42, from the inside adjacent to the plunger 30 to the opposite outside. In this manner, each belt 50 runs generally coincident with both the inside and the outside of the plunger slot 42, thereby substantially closing off the plunger slot 42. In the embodiment shown, the rotating elements 52 are rollers and may include an inner race and bearings.

Figure 5:
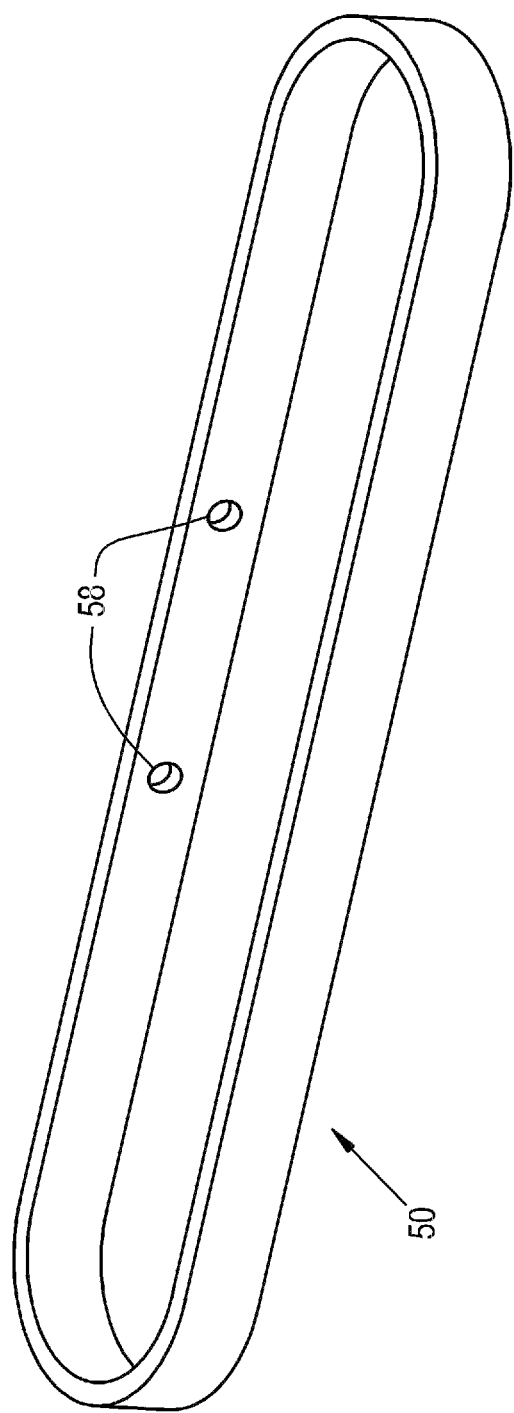
FIG. 5 is a perspective view of one of the plunger slot belts shown in FIGS. 2-4.

Each belt 50 is attached to a respective side 46 of plunger 30 and extends generally inline with the one or more plunger rollers 44 extending from that side of the plunger 30. In the illustrated embodiment, each belt 50 is configured as an endless belt (shown in FIG. 5) extending along the respective side 46 of the plunger 30, between the plunger 30 and the respective one or more plunger rollers 44 extending from that side 46 (see FIGS. 3 and 4). Each belt 50 can be fastened to the plunger 30 at the forward and rearward end of the plunger 30 using clamp plates 54 with appropriate fasteners, such as screws or bolts 56. The bolts 56 can be positioned above and below the belt 50, as shown, or can pass through the belt 50. Each belt 50 can also include a number of holes 58, such as the two holes 58 shown in FIG. 5, that are sized and configured to allow passage of shafts (not numbered, but visible in FIGS. 3 and 4) carrying the plunger rollers 44. Each hole 58 is thus positioned in relation to a corresponding plunger roller 44. Each belt 50 has a predetermined height providing a predetermined clearance distance relative to the height of plunger slots 42.

During operation of baler 10, the plunger 30 reciprocates back and forth between a forward-most position (FIG. 4, closest to the outlet 32), and an opposite rearward-most position (FIG. 3), within the main bale chamber 26. As the plunger 30 reciprocates back and forth within the main bale chamber 26, the plunger rollers 44 likewise reciprocate back and forth within a respective plunger slot 42. Further, as the plunger 30 reciprocates back and forth, each belt 50 is operable to reverse a direction of rotation about the respective pair of rotating elements 52, as indicated by directional arrow 60. Each belt 50 thus substantially covers both the inside and the outside of the corresponding plunger slot 42 at any and all positions of the plunger 30 within the main bale chamber 26.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a main bale chamber that includes a pair of opposed side walls, each said side wall including a plunger slot arrangement defining a plunger slot, each said plunger slot having opposite ends and being open at an inside adjacent to an interior of said main bale chamber;
   a pair of rotating elements positioned within each said plunger slot, each said rotating element being located at a corresponding said end of a respective said plunger slot;
   a pair of plunger slot belts, each said belt being positioned in association with a respective said plunger slot and partially wrapping a respective said pair of rotating elements associated with each said plunger slot; and
   a plunger reciprocally disposed within said main bale chamber, said plunger including a pair of opposed sides and at least one plunger roller extending laterally outward from each said side, each said plunger roller being positioned within a respective said plunger slot, and wherein each said belt is attached to a respective said side of said plunger and extends inline with said at least one plunger roller extending from said respective side of said plunger.

2. The agricultural baler of claim 1, wherein each said belt runs generally coincident with said inside of said respective plunger slot, thereby substantially entirely closing off said respective plunger slot.

3. The agricultural baler of claim 2, wherein each said plunger slot is open at an outside which is opposite from said interior of said main bale chamber, and each said belt runs generally coincident with said outside of said respective plunger slot.

4. The agricultural baler of claim 1, wherein each said belt is operable to reverse a direction of rotation about said respective pair of rotating elements as said plunger reciprocates back and forth within said main bale chamber.

5. The agricultural baler of claim 1, wherein each said belt is an endless belt extending along said respective side of said plunger, between said plunger and said respective at least one plunger roller.

6. The agricultural baler of claim 5, wherein each said belt includes a number of holes, each said hole being positioned in relation to a corresponding said at least one plunger roller.

7. The agricultural baler of claim 1, wherein each said plunger slot has a height, and each said belt has a corresponding height providing a predetermined clearance relative to said plunger slot height.

8. The agricultural baler of claim 1, wherein each said rotating element is a roller.

9. The agricultural baler of claim 1, wherein said agricultural baler is a large square baler.

* * * * *